United States Patent
Arbanas

(10) Patent No.: US 7,566,282 B2
(45) Date of Patent: Jul. 28, 2009

(54) VEHICLE STEERING SYSTEM COMPRISING A DEVICE FOR ALTERING THE TRANSMISSION RATIO

(75) Inventor: Viktor Arbanas, Baden (CH)

(73) Assignee: ThyssenKrupp Technologies AG, Essen (DE)

( * ) Notice: Subject to any disclaimer, the term of this patent is extended or adjusted under 35 U.S.C. 154(b) by 105 days.

(21) Appl. No.: 10/568,231

(22) PCT Filed: Aug. 17, 2004

(86) PCT No.: PCT/EP2004/009198

§ 371 (c)(1),
(2), (4) Date: Feb. 14, 2006

(87) PCT Pub. No.: WO2005/036027

PCT Pub. Date: Apr. 21, 2005

(65) Prior Publication Data

US 2006/0264290 A1 Nov. 23, 2006

(30) Foreign Application Priority Data

Sep. 16, 2003 (DE) ................. 103 42 681

(51) Int. Cl.
*B62D 11/02* (2006.01)
(52) U.S. Cl. ............... 475/19; 475/21; 475/28
(58) Field of Classification Search .......... 475/18, 475/19, 21, 28; 180/443, 444
See application file for complete search history.

(56) References Cited

U.S. PATENT DOCUMENTS

| | | | | | |
|---|---|---|---|---|---|
| 4,416,345 | A | * | 11/1983 | Barthelemy | 180/444 |
| 4,530,413 | A | * | 7/1985 | Buike et al. | 180/444 |
| 4,573,545 | A | * | 3/1986 | Kalns | 180/404 |
| 4,718,508 | A | * | 1/1988 | Tervola | 180/6.44 |
| 4,741,408 | A | * | 5/1988 | Bausch et al. | 180/443 |
| 4,765,425 | A | * | 8/1988 | Saito et al. | 180/444 |
| 4,956,590 | A | * | 9/1990 | Phillips | 318/432 |
| 5,299,649 | A | * | 4/1994 | Sano et al. | 180/400 |
| 5,423,391 | A | * | 6/1995 | Shimizu | 180/446 |
| 5,711,396 | A | * | 1/1998 | Joerg et al. | 180/444 |
| 5,906,250 | A | * | 5/1999 | Haga et al. | 180/444 |
| 5,927,428 | A | * | 7/1999 | Nagao et al. | 180/444 |
| 6,026,925 | A | * | 2/2000 | Nagao et al. | 180/444 |
| 6,199,654 | B1 | * | 3/2001 | Kojo et al. | 180/443 |
| 6,208,922 | B1 | * | 3/2001 | Easton | 701/41 |
| 6,705,424 | B2 | * | 3/2004 | Ogawa et al. | 180/446 |

* cited by examiner

Primary Examiner—Ha D. Ho
(74) Attorney, Agent, or Firm—Crowell & Moring LLP

(57) ABSTRACT

A vehicle steering device has a single electric motor which, at the same time, introduces energy for desired rotational speed conversion and auxiliary power support into the system. Steering interventions by a driver of the vehicle, in the form of a driving moment exerted by a vehicle steering wheel, are superimposed with a driving movement of the electric motor, and these two motors are initiated jointly onto a driving element.

19 Claims, 4 Drawing Sheets

Schnitt IV:IV

VEHICLE STEERING SYSTEM COMPRISING A DEVICE FOR ALTERING THE TRANSMISSION RATIO

BACKGROUND OF THE INVENTION

Figure 1:
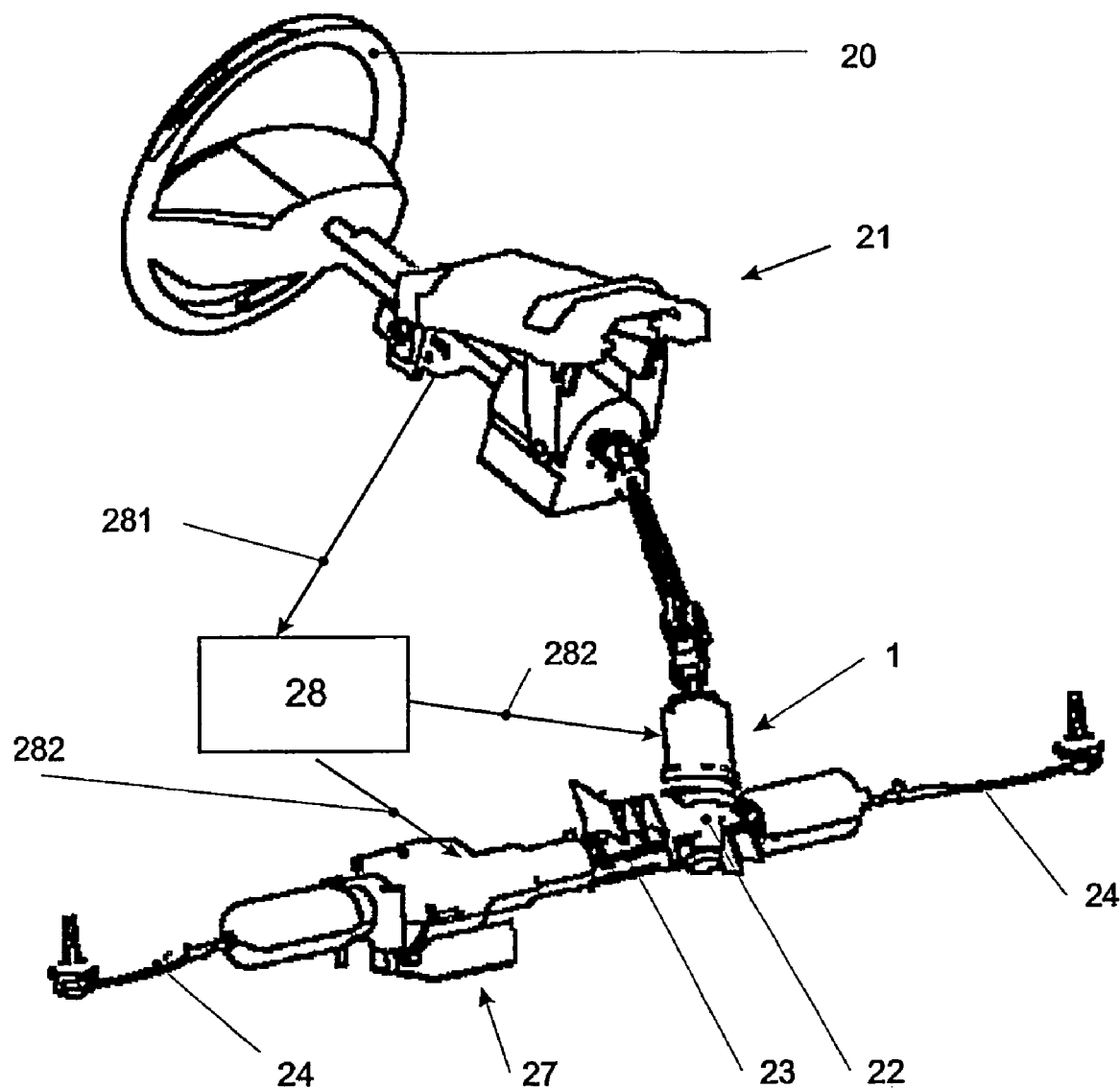

The invention relates to a vehicle steering system with a device for changing the gear ratio, and with an electrical auxiliary drive.

A series of vehicle steering systems is known, for which the function of rotational speed conversion and an auxiliary drive are realized in separate devices.

Accordingly, in the DE 19823721 A1, a rotational speed superimposition is introduced. A housing, in which there are gearings of an internal gear wheel of two planetary gear trains, is driven here by a driving wheel. An electric motor, disposed in the housing, drives the sun wheel of the second planetary gear train. The planet carrier of the first planetary gear train drives the sun wheel of the second planetary gear train. The planet gears of the second planetary gear train are supported at the internal gear wheel of the housing and the planet carrier is connected with the transmission output shaft. In the embodiments shown, the driving mechanism of the sun wheel of the first planetary gear train is realized directly by the rotor of the electric motor. The desired rotational speed gear ratios can be represented by an appropriate control of the electric motor. However, this solution, shown in the state of the art, has some decisive disadvantages. When the steering wheel is turned, the whole unit is turned along with it. Therefore, when turning the steering wheel, the driver must employ the whole driving torque for turning the steering pinion and, additionally, overcome the inertia of the whole unit. In order to equalize this, such systems are equipped with an additional auxiliary power support at a different place. In addition, such a transmission unit is afflicted with play. As a result, the driving shaft and driven shaft must be mounted, so that the whole unit is held and a connection with a high positional stability between the steering wheel and the driven shaft is attained. This represents a not inconsiderable structural expense. Furthermore, the coupling of electric energy into the electric motor, which rotates along with the steering wheel, is expensive.

In a further state of the art, the DE 19852447 A1, a solution for the rotational speed conversion is introduced, for which the electric motor is coupled over a worm drive with the speed-changing transmission constructed as a planetary gear train. The transmission unit is fixed to the car body here, so that the driver does not have to support the whole of the torque, which is introduced by the electric motor. However, a series of disadvantages is also associated with this solution. The coupling-in over a worm transmission leads to very low efficiencies in the rotary speed conversion. Furthermore, the arrangement requires appreciable space, which, due to the geometrically determined positions of the components with respect to one another, is not very flexible. Here also, an additional auxiliary power support is required at a different place.

Moreover, the above-mentioned state of the art jointly has even further disadvantages. All steering systems require the highest degree of safety in the event of a failure of the electrical components. For example, it must be possible to steer the vehicle even if the electric motors fail. For the state of the art shown above, this means that, in the event of a power failure or other disorder, the torque, introduced by the steering wheel, must not be introduced into the electric motor. For this purpose, the transmissions with high conversions are designed with self-locking. However, this leads to low efficiencies and slow response times of the electric motor driving mechanisms. Independently of the change in the rotational speed conversion, an additional driving mechanism is required as power support for the steering (power steering).

It is an object of the invention to eliminate the disadvantages of the state of the art and, at the same time, to make a compact component available, the reaction force on the steering wheel not being increased noticeably if at all. At the same time, the system shall offer in a simple way the necessary redundancy in the event of a malfunction of the electrical units.

Pursuant to the invention, the whole of the steering device has only one electric motor, which, at the same time, introduces the energy for the desired rotational speed conversion and the auxiliary power support into the system. This inventive, new device, in which the change in the conversion ratio as well as the introduction of the auxiliary power is realized, is referred to in the following as steering differential. The torques from the steering wheel and from the electric motor are introduced into the steering differential and the whole of the torque is passed on to the steering adjustment. In so doing, it is unavoidable that the torque, introduced by the electric motor, must be supported at least partially at the torque, introduced by the steering wheel.

In contrast to the state of the art, however, the housing of the conversion ratio device is fastened to be body of the vehicle. However, by selecting suitable mechanical conversions in the superimposed gear mechanism between the driving mechanism of the electric motor, of the drive shaft driven by the steering wheel and the drive shaft, the torques, which become noticeable at the steering wheel and the torques, which are made available for adjusting the wheels, can be adjusted largely as desired to a fixed ratio to one another. In this connection, it should be noted that, for steering a vehicle, a driver requires a torque Ma. Due to this configuration, the number of components of the steering device is reduced significantly, because only one electric motor and, with that, only one crank mechanism is required in the steering device.

Pursuant to the invention, the electric motor, the drive shaft, which is connected non-rotationally with the steering wheel, and the driven device assigned to the wheels, such as a driven shaft or steering rack, are disposed coaxially with one another. The steering differential consists of two planetary gear trains, which are mounted in one housing and with the help of which the appropriate transmission conversions are realized. As a result, the construction becomes very compact.

In a special, preferred embodiment, a permanently energized synchronous motor is used as electric motor. For this electric motor, the stator with the energizing coils is connected permanently with the housing of the device and the rotor is disposed coaxially in the interior, surrounds the driven device and transfers its torque to the planet carrier of the first planetary gear train and, with that, causes the first planet carrier to rotate. By these means, the planet gear wheels are caused to rotate and, at the same time, are supported at the half of the internal gear wheel fastened to the housing. As a consequence, the torque is transferred to the second rotatable half of the internal gear wheel with a number of teeth different from that of the first internal gear wheel that is fastened to the housing. This second, rotatable half of the internal gear wheel is coupled non-rotationally with a first half of an internal gear wheel of the second planetary gear train. In this way, the torque is transferred from the first to the second planetary gear train. The torque is transferred from this half of the internal gear wheel to the planet gear of the second planet carrier. If the number of teeth of the first half of the internal gear wheel and the number of teeth of the second half of the internal gear wheel of the second planetary gear train are different, the torque is transferred to the second planet carrier. At the same time, the second planet carrier, in the coupled state, is connected non-rotationally with the drive shaft, which is connected non-rotationally with the steering wheel. By these means, the torque of the drive shaft is transferred to the second planet carrier. Moreover, the torques, introduced by the electric motor into the second planet carrier, are supported by the steering wheel.

The planet gears of the second planet carrier transfer the torque to the second half of the internal gear wheel. Due to the arrangement, the torque, introduced by the electric motor, and the torque, introduced by the steering wheel, are introduced as a sum into the second half of the internal gear wheel of the second planetary gear train.

The second half of the internal gear wheel of the second planetary gear train introduces the torque directly into the non-rotationally connected driven device. The driven device may be a driven shaft or a conversion transmission for converting the rotational movement into a translational movement, for example, a ball-type linear drive.

The arrangement of the stator of the electric motor with the energizing coils, the stator being fixed to the housing, makes it easily possible to couple the electric motor electrically to the vehicle.

Moreover, the arrangement of the steering differential, attached to the body of the car, increases the positional stability between the steering wheel and the power take-off in a structurally simple manner.

Pursuant to the invention introduced, the steering differential can be disposed between the steering gear and the steering wheel, as well as between the steering gear and the steering tie rod. The selection is made in accordance with the respective circumstances of the available space and according to other technical and commercial requirements. In the event that the steering differential is disposed between the steering gear and the steering tie rod, the drive shaft will usually be connected directly with a conversion transmission for converting a rotational movement into a translational movement. For example, a ball-type linear drive is driven directly here.

Advantageously for the further development of the invention, a safety clutch or a circuit, which forces a direct mechanical coupling between the driving shaft and the driven shaft in the event of a fault or of special driving situations, such as a power failure, a computer defect or, when the ignition is switched off, etc., is integrated in the steering differential. The torque, introduced by the electric motor, is then without effect and the driver, due to the mechanical coupling, has complete control of the steering system.

The same coupling may be provided with a different step, for which the drive shaft and, with that, the steering wheel are uncoupled or also locked in position against rotation under pre-tension. However, the driven shaft is controlled by the electric motor by a control device. This last case may be used, for example, for automated parking. In this way, even functions, which otherwise can be represented only with a steer-by-wire system, may be realized.

In an alternative embodiment, the electric motor is disposed parallel to the axis of the steering differential and is coupled over a spur gear or belt drive or chain drive to the conversion transmission or driving transmission.

The inventive transmission may also be operated with a hydraulic driving mechanism, such as an orbital engine or a "reversed" vane-type pump.

As an alternative to using planetary gear trains, it is also possible to use other planetary gearing, such as a harmonic drive transmission. The transmissions may also be constructed as friction drives.

BREIF DESCRIPTION OF THE DRAWINGS

An example of the invention is shown in the following. In the drawing

Figure 2:
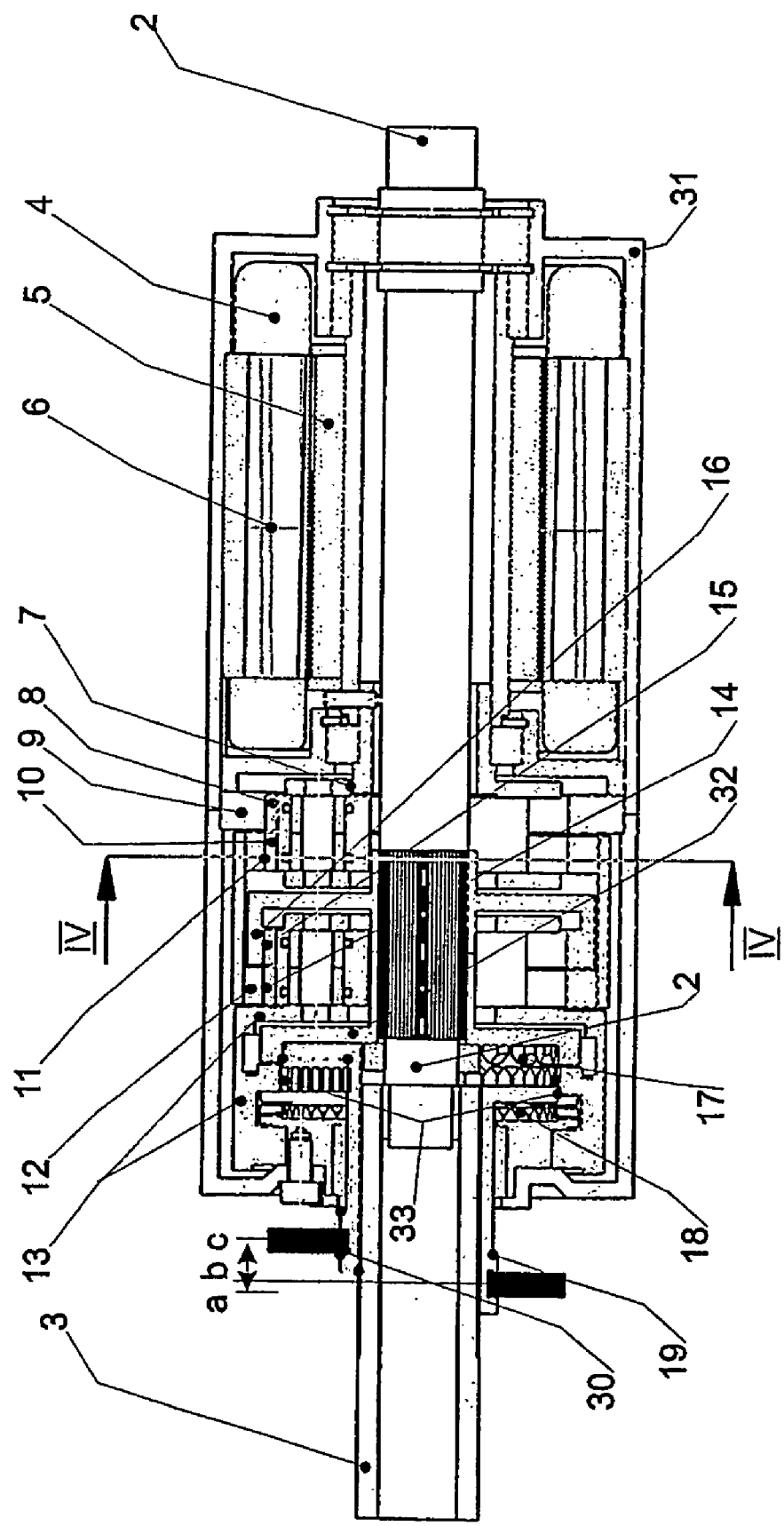
Figure 3:
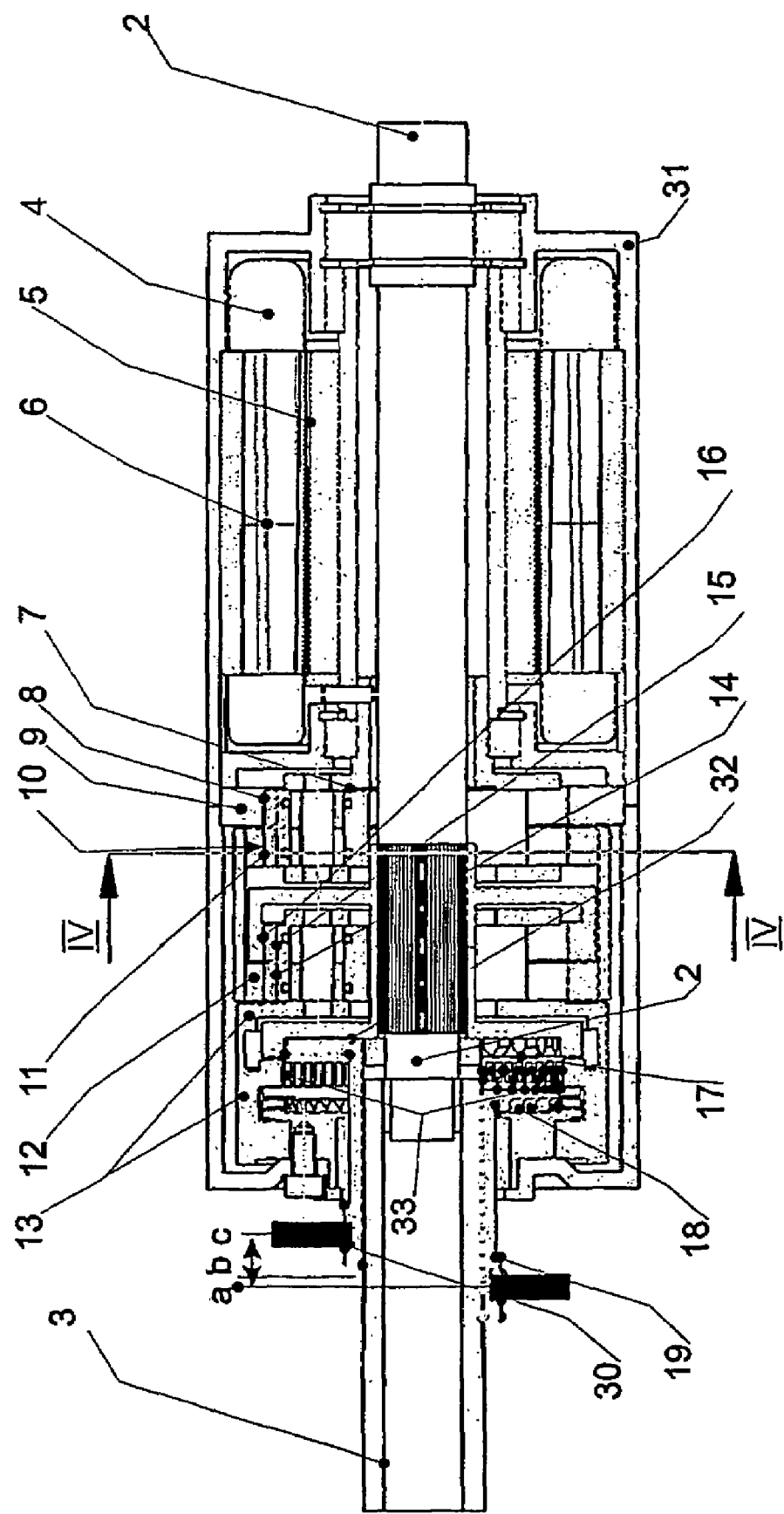
Figure 4:
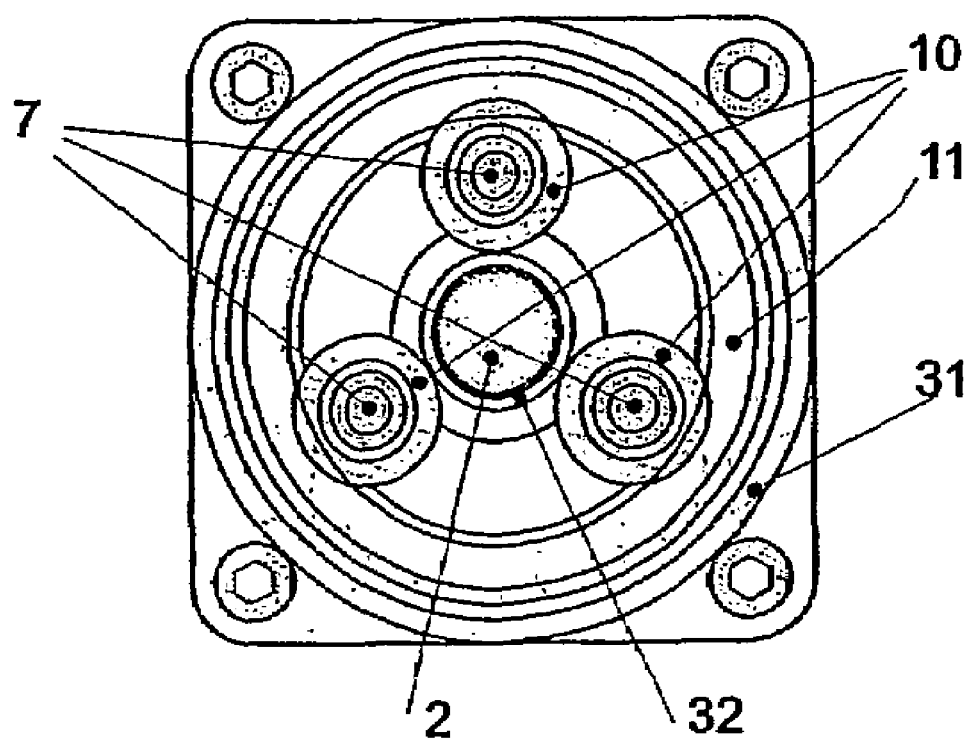

FIG. 1 shows a diagrammatic construction of a steering system with auxiliary power support, FIG. 2 shows a longitudinal section through a preferred embodiment of a steering differential with an integrated safety clutch and an integrated "automatic operation", the "manual operation" being shown above the center line of the switch setting and "operation with power support" being shown below the center line of the switching setting, FIG. 3 shows a longitudinal section corresponding to FIG. 2; in this case, however, the "manual operation" switch setting is shown above the center line and the "automatic operation" switch setting is shown below the center line and FIG. 4 shows a cross-section along the cutting plane IV-IV in FIG. 2 or FIG. 3.

DESCRIPTION OF THE INVENTION

The diagrammatic construction of a steering device 29, shown in FIG. 1 as steer-by-wire arrangement or steering device 29 with electrical auxiliary power support, corresponds essentially to the state of the art. Among other things, it consists of a steering wheel 20, a steering column 21, the steering transmission 22 and the two steering tie rods 24. The steering tie rods 24 are driven by the steering rack 23. The inventive steering differential 1 or 27, the details of which are shown in FIGS. 2 and 3, serves as driving mechanism Depending on the embodiment, the steering differential is located either between the steering wheel 20 and the steering transmission 22 (position 1) or between the steering transmission 22 and the steering tie rods 24 (position 27). The steering differential 27 contains then a conversion transmission for converting the rotational movement into a translational movement, for example, a ball-type linear drive. In the normal case, the wishes of the driver are transferred by the steering wheel 20 over a sensor system, which is not shown here, as a signal to 281 to a control device 28. In the control device 28, optionally with the help of a sensor signal of the driving unit (not shown here) and further signals describing the driving state, the appropriate control voltage 282 for the electric motor or servo motor, which is disposed in the steering differential 1 or 27, is put out.

FIGS. 2 and 3 show an embodiment of the steering differential 1, disposed between the steering wheel 20 and the steering transmission 22 with an integrated safety clutch and an integrated reversing clutch in the "automatic operation" position.

The drive shaft 2 is shown, which is connected non-rotationally with the pinion of the steering transmission 22, the drive shaft 3, which is connected non-rotationally with the steering wheel 20, the excitation windings 4 of the driving motor, the permanent magnets 5 of the driving motor, which are disposed non-rotationally at the rotor, as well as the two planetary gear trains and the multiple connection.

The multiple connection has the switching positions a, b or c, which are controlled by an indicated switching lever 30. In switching position a, the coupling 17 is engaged and an "automatic operation", which may also correspond to "steer-by-wire mode", is realized, that is, an automatic steering mode without driver intervention is realized at the steering wheel 20. The steering wheel is locked, but can be rotated by force if the coupling 18 is designed appropriately. In the switching position b, power-assisted operation is realized. The torque from the electric motor and the torque from the steering column are superimposed here. The steering force, exerted on the steering wheel 20, is reinforced by the electric motor. At the same time, with appropriate control of the motor, the rotational speed is converted, so that, when the steering wheel 20 is rotated by a small amount, an electrically adjustable, basically arbitrarily large rotation of the drive shaft 2 becomes possible. In the switching position c, the drive shaft 3 is connected mechanically directly with the drive shaft 2 and the electric motor is uncoupled. This switching position c is intended as a mechanical backup solution in the event that the electronic system or the voltage supply fails, when the ignition is switched off or in the case of other special situations of the vehicle.

The multiple connection is actuated by the switching sleeve 19 by means of the switching lever 13. In the embodiment introduced, the switching sleeve 19 is connected non-rotationally with the drive shaft 3. In the switching position a, the couplings 18 and 33 are engaged and the coupling 17 is uncoupled. In the switching position b, the coupling 17 and 18 are uncoupled and the coupling 33 is engaged. In the switching position c, the coupling 17 is engaged and the couplings 18 and 33 are uncoupled. All couplings in the embodiment shown are realized by appropriate gearings.

Starting out from the electric motor and the drive shaft 3, the torque flows over the two planetary gear trains into the drive shaft 2.

Moreover, the torque flows from the rotor of the electric motor over a first planet carrier 7, which is connected non-rotationally with the rotor of the driving motor, into a first planetary gear train. In each case, this planetary gear train has axially divided planet wheels, consisting of planet wheel halves 8, 10, which are coupled non-rotationally with one another, and internal gear wheels, consisting of internal gear wheel halves 9, 11. The planet wheel halves 8, mounted on the first planet carrier 7, are supported in the internal gear wheel halves 9, which are connected permanently with the housing 31. Over the planet wheel halves 10, which may also be constructed in one part with the planet wheel half 8, the torque is passed into the rotatably mounted internal gear wheel half 11, which, in turn, passes the torque into a similarly constructed second planetary gear train. An internal gear wheel half 12 of the second planetary gear train is tied non-rotationally to the internal gear wheel half 11 of the first planetary gear train. The torque is passed over the planet wheel halves 14 into the planet carrier 13 of the second planetary gear train. Alternatively to the non-rotational coupling or the one-part construction of the planet wheel halves 8 and 10 or 14 and 15, freely rotating sun wheels (not shown here), over which the torque is transferred from the respectively first planet wheel half 8 or 15 to the second planet wheel half 9 or 14, may also be disposed in the respective planetary gear train. The flow of the torque changes depending on the switching position a, b or c.

In the switching position a, the "automatic operation", the steering wheel 20 is connected non-rotationally over the coupling 18 with the housing 31 and, at the same time, over the coupling 33 with the planet carrier 13 of the second planetary gear train, so that the planet carrier 13 cannot rotate with respect to the housing 31 and, with that, the vehicle. Consequently, the whole of the torque is passed directly over the planet wheel halves 14 into the planet wheel halves 15, which may also be constructed in one piece with the planet wheel half 14, into the internal gear wheel half 16 and, with that, into the driven device 32. The torque from the driven device 32 is passed directly, for example, over a gearing to the driven shaft 2 and, with that, into the steering gear.

In the switching position b, the "operation with power support", the torque, starting out from the driver, is introduced by the drive shaft 3 over the coupling 33 into the planet carrier 13. The sum of the torques of the electric motor and of the drive shaft 3 are introduced, as in switching position a, over the planet wheel halves 14, 15 into the internal gear wheel half 16 and the driven element 32, connected with it, and from there into the driven shaft 2. Corresponding to the number of teeth of the planet wheel halves 8, 10, 14, 15 and internal gear wheel halves 9, 11, 12, 16 of the participating planetary gear trains, the torque is divided with respect to the drive shaft 3, the driven shaft 2 and the rotor of the electric motor.

In the switching position c, the "manual operation", the drive shaft 3 is coupled directly with the driven shaft 2 over the coupling 17. Because the coupling 33 is uncoupled, the planet carrier 13 rotates completely freely. No torque whatsoever is introduced into the steering transmission from the rotor of the electric motor. The driver has complete control over the direction, in which the vehicle is steered.

In the embodiment shown, the steering differential 1 is disposed between the steering wheel 20 and the steering transmission 22. It may be disposed at any convenient place, for example, also within the steering column 21 or the guide box (which is not specifically shown here).

In a further embodiment, the steering differential 27 is disposed between the steering transmission 22 and the steering tie rod 24. In this case, the driven device 32 is constructed as a conversion transmission for converting a rotational movement into a translational movement. In the simplest case, preferred pursuant to the invention, a recirculating ball screw nut is selected directly here as a driven device 32. In this case, the driven shaft 2 caries out a translational movement and not a rotational movement.

LIST OF REFERENCE SYMBOLS 1 steering differential
2 driven shaft
3 driving shaft
4 energizing coils
5 permanent magnets
6 stator
7 first planet carrier
8 planet wheel half
9 internal gear wheel half
10 planet wheel half
11 internal gear wheel half
12 internal gear wheel half
13 planet carrier
14 planet wheel half
15 planet wheel half
16 internal gear wheel half
17 coupling
18 coupling
19 switching sleeve
20 steering wheel
21 steering column
22 steering gear
23 steering rack
24 steering tie rod
27 steering differential
28 control device 29 steering device
30 switching lever
31 housing
32 driven element
33 coupling gearing
281 signal driver's desire
282 control voltage for electric motor
a switching position for "automatic operation"
b switching position for "operation with power assisted steering"
c switching position for "manual operation".

The invention claimed is:

1. A vehicle steering system, comprising: a device for changing gear ratio; an auxiliary electrical drive, said device for changing gear ratio containing a stator and said auxiliary electrical drive having a rotor and superimposing steering interventions of a driver over a steering wheel and transferring said steering interventions to steering motion of the vehicle wheels; a housing; a driving unit drivable by said steering wheel; a driven element connectable with the vehicle wheels, as well as at least two planetary gearings, including a first planetary gearing that is drivable by said rotor of an electric motor, and a second planetary gearing; a driving moment starting out from said steering wheel being superimposed with a driving moment of said electric motor and said two moments being initiated jointly as an output moment into said driven element, a ratio of rotational speed of said driving unit to rotational speed of said driven element being adjustable, each of said planetary gearing comprising a planetary gear train; said rotor being connected to a planet carrier of the planetary gear train of said first planetary gearing, one part of an internal gear wheel of said planetary gear train of said first planetary gearing being connected with said housing; a second part of said internal gear wheel of said planetary gear train of said first planetary gearing being connected to a first part of an internal gear wheel of the planetary gear train of said second planetary gearing; a driving shaft connected with a second part of said internal wheel of said planetary gear train of said second planetary gearing; planet wheel halves engaging parts of said internal gear wheel of said planetary gear train of said first planetary gearing being coupled non-rotationally with one another; a planet carrier of said planetary gear train of said second planetary gearing being switchably connectable with said driving unit connected with said steering wheel and said drive shaft.

2. A vehicle steering system as defined in claim 1, including one-part sun wheels of said planetary gear trains mounted freely rotatably.

3. A vehicle steering system as defined in claim 1, wherein said drive shaft is connected directly with a driven shaft in a switching position triggered automatically as a safety operating position when interference is present with a steering differential at least under engine voltage failure.

4. A vehicle steering system as defined in claim 3, wherein said switching is triggered mechanically.

5. A vehicle steering system as defined in claim 1, wherein said housing is connected non-rotationally with the vehicle.

6. A vehicle steering system as defined in claim 1, wherein rotational movement of said steering wheel is introducible over said driving unit into one function part of one planetary gearing.

7. A vehicle steering system as defined in claim 6, wherein rotational movement of said steering wheel is connectable by a first coupling with associated function parts of associated planetary gearing.

8. A vehicle steering system as defined in claim 1, wherein said driving unit is connectable with a function part of said second planetary gearing and reaction forces from said auxiliary electrical drive have only slight effect on a steering force.

9. A vehicle steering system as defined in claim 7, including a second coupling, rotational movement of said steering wheel being blockable by said further coupling.

10. A vehicle steering system as defined in claim 9, wherein rotational movement of said steering wheel is transferable directly to said driven element by a third coupling, said auxiliary electrical drive being severable by severing at least one of said first and second couplings of said auxiliary electrical drive.

11. A vehicle steering system as defined in claim 10, wherein said first, second and third couplings are combined into one coupling unit.

12. A vehicle steering system as defined in claim 10, wherein said couplings comprise positive couplings.

13. A vehicle steering system as defined in claim 1, wherein said electric motor, said driving unit, said driven element and said planetary gearings are arranged coaxially with one another.

14. A vehicle steering system as defined in claim 1, wherein said steering system is disposed between said steering wheel and a steering gear, and said driving unit, said driven element and a driven device transfer a rotational movement.

15. A vehicle steering system as defined in claim 14, including a conversion transmission for converting a rotational movement into a translational movement and located between said steering gear and at least one steering tie rod, said driving unit and said driven element transferring rotational movement, said driven device transferring translational movement.

16. A vehicle steering system as defined in claim 1, including a control device for controlling rotational speed and direction of rotation of said driven element based on basis of an evaluation of an actual driving situation and adjustment of a control of said electrical auxiliary drive.

17. A vehicle steering system as defined in claim 1, wherein said electrical auxiliary drive comprises a single electric motor.

18. A vehicle steering system as defined in claim 1, wherein said internal gear wheels of said planetary gear trains and planet wheels comprise two parts in an axial direction.

19. A vehicle steering system as defined in claim 18, wherein said parts of said internal gear wheels and said planet wheels have different numbers of teeth.

* * * * *